Jan. 6, 1942.  A. CRUICKSHANK  2,269,360
METHOD FOR TESTING THE MACHINABILITY OF FREE-CUTTING STEEL
Filed Jan. 6, 1940
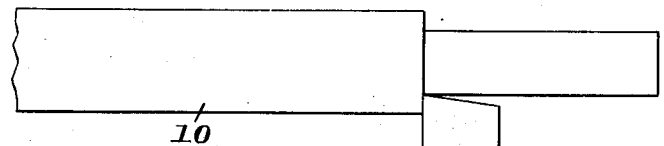
Fig.1.
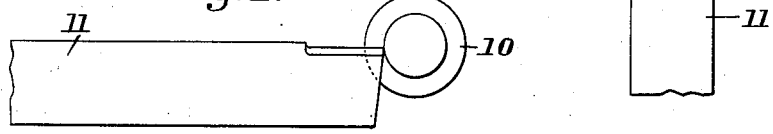
Fig.2.
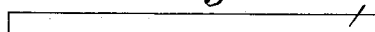
Fig.3.
Fig.5.
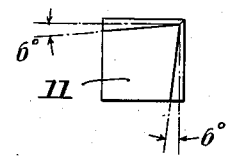
Fig.4.
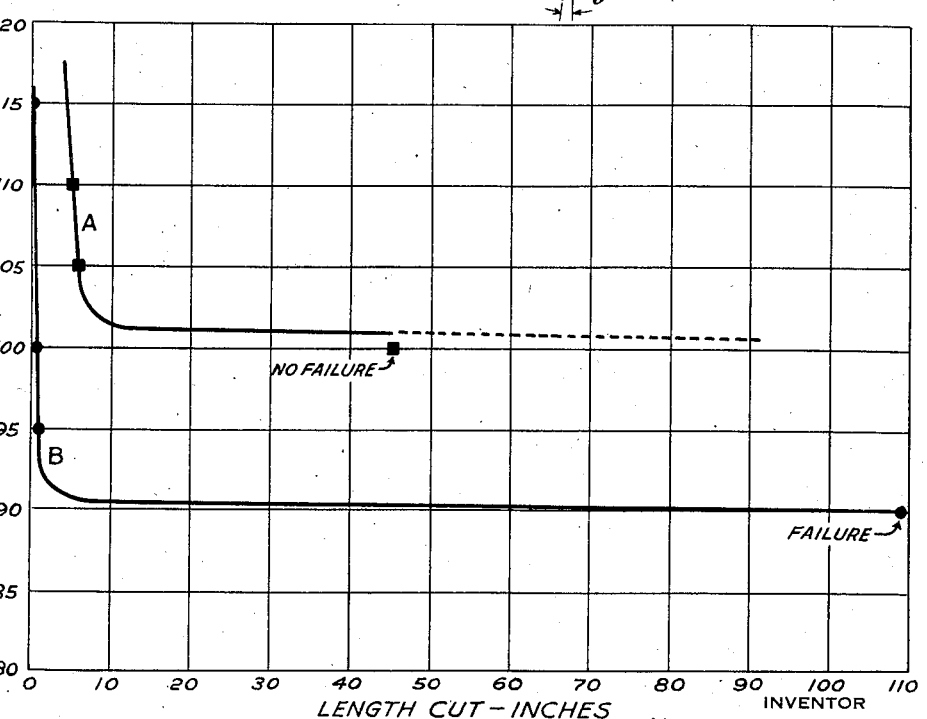
Fig.6.
INVENTOR
Alexander Cruickshank
by his attorneys
Stebbins, Blenko & Parmelee Patented Jan. 6, 1942

2,269,360

UNITED STATES PATENT OFFICE 2,269,360

METHOD FOR TESTING THE MACHINABILITY OF FREE-CUTTING STEEL

Alexander Cruickshank, Pittsburgh, Pa., assignor to Jones & Laughlin Steel Corporation, Pittsburgh, Pa., a corporation of Pennsylvania Application January 6, 1940, Serial No. 312,720

4 Claims. (Cl. 73—51)

This invention relates to the art of testing materials and, in particular, to a method for testing the machinability of steel such as free-cutting steel.

The machinability of free-cutting steel varies considerably between different melts or blows and sometimes even between ingots from the same melt or blow. It is important for the user of free-cutting steel to know the machinability of various lots of steel but no convenient index of machinability nor test therefor has been available heretofore. Numerous expedients have been resorted to but have not been found to give the desired qualitative indication. Measurements have been made, for example, to determine the hardness of the steel, its increase in hardness on cold working, the brittleness, the pressure on a cutting tool in use, or the temperature of the tool tip. It has also been proposed to measure the depth penetrated by a drill operating at constant speed under a constant load or of a hacksaw cutting under constant load. None of these expedients, however, has proved sufficiently reliable for general acceptance, when compared with the results obtained in actual production.

I have invented a novel testing method which overcomes the objections to the aforementioned procedures and provides an accurate and reliable indication of machinability. In a preferred practice of the invention, I provide a cutting tool of such characteristics that it will fail in service under conditions generally similar to those of commercial screw machine practice, within a relatively short time, e. g., a few minutes. To test the machinability of a given specimen of steel, I subject it to a cutting operation, e. g., turning in a lathe, with such a tool, and note the length of time before failure of the tool when operating at a predetermined surface speed, depth of cut, and rate of feed. By comparing the operating time before failure of a given tool with results obtained with similar tools on other specimens of known machinability, an accurate indication of the qualities of the particular specimen is obtained.

The invention is illustrated diagrammatically in the accompanying drawing, as well as a graph showing the results obtained. In the drawing—

Fig. 1 is a diagrammatic plan view showing a specimen being turned with a tool according to the invention;

Fig. 2 is an end elevation;

Figs. 3, 4 and 5 are respectively a plan view, side and end elevation of a tool according to the invention; and Fig. 6 is a graph showing the results of tests made according to the invention.

In practicing the invention, I prefer to prepare a specimen such as a round bar 10 of suitable dimensions, and turn it down in an ordinary turning lathe, by means of a cutting tool 11. The composition of the tool and the heat-treatment to which it is subjected are such that the tool fails very rapidly in service, i. e., after a few minutes. The tool may, for example, be of the following composition:

| | Per cent |
|---|---|
| Carbon | .95 |
| Manganese | .25 |
| Silicon | .30 |
| Chromium | 3.75 |
| Vanadium | .25 |

The balance substantially iron.

Steel of this composition is heat-treated by being water-quenched from a temperature of about 1650° F., and then drawn at a temperature of about 800° F. to a hardness of about 48-52 Rockwell C scale. A piece of such steel of suitable shape for a tool is ground to a predetermined sharpness and clearances. The side, top and end clearance angles, as shown in the drawing, are preferably about 6° although this may be varied to some extent.

The tool 11 is adjusted to take a predetermined depth of cut, e. g., $\frac{1}{16}''$, and the lathe feed is adjusted to a suitable value such as .003'' per revolution of the specimen. The speed of the lathe is adjusted to provide a suitable surface speed of the specimen such as 120' per minute. By making a cut along the specimen 10 with the tool 11, commencing at one end, an index of the machinability of the steel of which the specimen is composed is afforded by the axial length of the cut or the time of operation of the tool before failure, compared to the length of cut made by a similar tool under the same conditions, on a specimen of steel the machinability of which has been indicated by its performance in ordinary machining operations. Tool failure is manifested by burning of the tool at the tip. The machining quality of the specimen is proportional to the length of the cut along the specimen or the length of time that the tool operates before failure.

Further information regarding the qualities of the steel of which the specimen is composed may be obtained by running a series of tests, maintaining two of the three cutting conditions (depth of cut, rate of feed and surface speed)

constant and varying one of them. Tests may be made, for example, at different surface speeds, i. e., 120' per minute, 110' per minute, 100' per minute, and so on, maintaining the depth of cut at 1/16" and the rate of feed at .003" per revolution. The same tool may be used for all tests by resharpening it after each to the same degree of sharpness, or a plurality of tools of the same composition and sharpness may be used successively. The result of such a series of tests on one class of material is indicated by curve A on Fig. 6. It will be noted that as the surface speed is reduced, the length of cut is increased slightly up to a certain critical value at which the length of cut is materially increased. This critical speed at which a slight change in speed produces a relatively great change in the length of cut with the testing tool of my invention is in itself an index of the machinability of the steel being tested. In other words, the steel whose characteristics are represented in curve A has a higher machinability than the steel whose characteristics are illustrated in curve B which exhibits a critical speed of about 90' per minute.

Curves similar to those shown at A and B could be drawn by varying either the depth of cut or the rate of feed while maintaining the other cutting conditions constant. In all cases, the life of the tool before failure or the volume of metal removed may be used as an index of machinability instead of the length of cut.

It is not ordinarily necessary to carry the test as far as indicated by curves A and B. It will usually be sufficient to make a test at a relatively high speed, e. g., 120' per minute. After failure of the tool, it should be reground or a new one inserted and the test repeated at a lower speed such as 110' per minute. By continuing to reduce the speed progressively, it may be observed at what speed the tool life is greatly increased. This critical speed may be determined quite accurately by making a check test at a speed somewhat higher than that at which a material increase in the tool life is first observed.

Tools suitable for the test described herein may be made from steel of compositions other than that given above. A satisfactory tool may be made of steel having the following composition:

|           | Per cent |
|-----------|----------|
| Carbon    | .62      |
| Manganese | 1.17     |
| Silicon   | .21      |

The balance substantially iron.

This steel is heat-treated by water-quenching from about 1550° F. to a hardness of about 62–65 Rockwell C scale and is used without a draw.

Another steel composition which is suitable for a testing tool is:

|           | Per cent |
|-----------|----------|
| Carbon    | .50      |
| Chromium  | 14.0     |
| Vanadium  | 0.3      |
| Tungsten  | 1.9      |

The balance substantially iron.

This steel is heat-treated by air-cooling from 1650° F. and has a hardness of about 32–34 Rockwell C scale.

It will be apparent from the foregoing that the invention provides a quick and easy method of determining the machinability of a given steel specimen by comparing the life of a special testing tool when used thereon, with the life of a similar tool when used on a specimen of steel, the machinability of which has been determined by regular cutting operations with conventional tools. The test requires no special equipment except a tool of such composition and heat-treatment as to fail rapidly in service when operated under more or less conventional conditions. The only cost involved is that of the tool which is small. By the aid of the invention, the steel manufacturer is able to supply to customers steel having the desired machining characteristics for specified operations.

Although I have illustrated and described but a preferred practice of the invention, the latter is not to be limited thereto but only by the terms of the appended claims.

I claim:

1. In a method of determining the machinability of steel, the steps including machining a specimen of the steel with a tool having a useful life of only a few minutes compared to the life of a production tool, maintaining the cutting conditions constant, continuing the machining until the tool fails, and comparing the amount of machining effected by said tool prior to failure, with the results obtained from a similar tool on another specimen.

2. In a method of determining the machinability of steel, the steps including machining a specimen of the steel under predetermined conditions as to surface speed, rate of feed, and depth of cut, with a tool having a useful life of only a few minutes compared to the life of a production tool, continuing the machining until the tool fails, then varying one of said cutting conditions, again machining a similar specimen with a similar tool and utilizing as an index of machinability that value of said one of the cutting conditions which causes tool failure after substantially a predetermined time.

3. In a method of determining the machinability of steel, the steps including machining a specimen of the steel under predetermined conditions as to surface speed, rate of feed, and depth of cut, with a tool having a useful life which is quite small compared to that of a production tool, continuing the machining until the tool fails, then varying one of said cutting conditions, again machining a similar specimen with a similar tool and determining that value of said one of said cutting conditions at which a slight change therein effects a relatively great difference in the tool life.

4. In a method of determining the machinability of steel, the steps including machining a specimen of the steel with a tool having a useful life which is quite small compared to that of a production tool, continuing the machining until the tool changes an indicative amount in its sharpness value, and evaluating the amount of machining effected by said tool.

ALEXANDER CRUICKSHANK.